Nov. 22, 1938.   R. J. TINGLE ET AL   2,137,313
INSULATED BUSHING
Original Filed April 3, 1936

Inventors
Roman J. Tingle
William W. Barcy
John E. Fuchs
By Robert E. Fowler
Attorney Patented Nov. 22, 1938

2,137,313

UNITED STATES PATENT OFFICE 2,137,313

INSULATED BUSHING

Roman J. Tingle, William W. Barcy, and John E. Fuchs, Detroit, Mich.

Original application April 3, 1936, Serial No. 72,474. Divided and this application November 2, 1936, Serial No. 108,710

1 Claim. (Cl. 247—43)

This invention relates to securing means for application to metallic conduits through which electric cables are run, said securing means being provided with protecting and insulating portions to avoid injury to the insulating cable covers and prevent the same from fracture which would cause a grounding of the cable, possible fire hazard and inoperability of the circuit with its attendant shut down of the apparatus supplied from the circuit, and is a division of our application Serial No. 72,474 filed April 3, 1936.

It relates more specifically to an insulated bushing adapted to be threaded on the end of a length of conduit which projects within a junction box and from which supply cable issues.

In running various supply lines it is customary at various desired points to have junction boxes for the interconnection of the circuits or to provide desired outlets for current consumption. These boxes have openings therein of the approximate size of the outside diameter of the conduit pipe. The end of the conduit is threaded and projects through the box aperture and has a locknut threaded thereon outside the box and then a metallic bushing on the pipe inside the box, the function of the two being to secure the pipe rigidly to the box. The cable is run from the end of the pipe across the surface of the bushing and usually out of another opening in the box which stretches it across the inner periphery of the bushing. The metal bushing frequently fractures the cable insulation and further vibration of the box after installation due to building vibration caused by motors etc., causes the bushing to wear through the insulation of the cable and a ground results causing shut down, delay and possibly fire. In order to prevent this we have provided an insulated bushing having the surface over which the cable extends formed of insulating material so that even if the cable insulation at this point breaks down there will still be no grounding of the circuit.

It is therefore an object of our invention to provide a bushing having an insulating insert at the desired position.

It is a further object to provide a bushing having a metallic portion engaging the pipe end to take the thrust of the threads and secure the bushing on the pipe.

It is a still further object to provide on the lower face of the bushing locking means to engage the box surface.

With the above and other objects in view which will later become evident, the embodiments of our invention are clearly described in the following specification and claim and illustrated in the accompanying drawing, in which:

Figure 2:
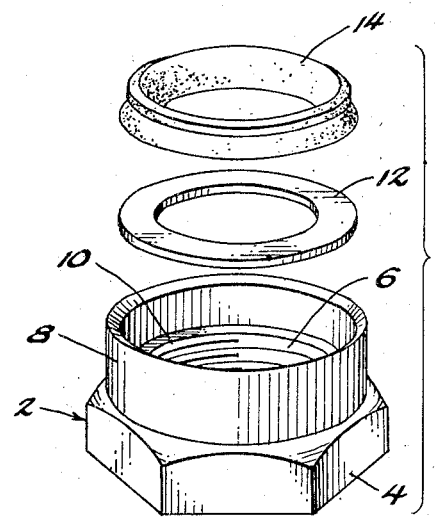
Figure 2 is a perspective view showing the various parts in spaced relation.

The preferred form of bushing is best shown in Figure 2 and is composed of a short cylindrical shell 2, the lower outer periphery of which is formed hexagonally as at 4 to permit the application of wrenches for tightening. The inner lower portion is threaded as at 6 and the upper portion 8 is thinner, has a larger smooth internal diameter and is strictly cylindrical. The fact that the lower threaded portion is of smaller internal diameter than the upper portion of course provides a shoulder 10 between the two sections and on this shoulder a washer or circular ring 12 is adapted to seat.

An annular insulating member 14 of irregular shape in cross section is supported upon the washer 12 and after this the upper edge of the portion 8 is peened over or pressed inwardly throughout the periphery to lock the insulating ring in place. This construction is best shown in Figure 1 where the dotted line position illustrates the unclamped position and the full line position of the upper portion 8 the clamped position.

A conduit 16 has applied to its threaded end a locknut 18 and then a junction box 20 is applied thereto and lastly a bushing, such as the one of the present invention, is threaded onto the conduit end clamping the box wall 20 between it and the locknut. In this connection it should be pointed out that the lower surface of the bushing has a series of extending tips 22 which sear the box surface as they are turned down forming a locking action with the box and also a good electrical connection or ground between the conduit and the bushing and box.

Figure 1:
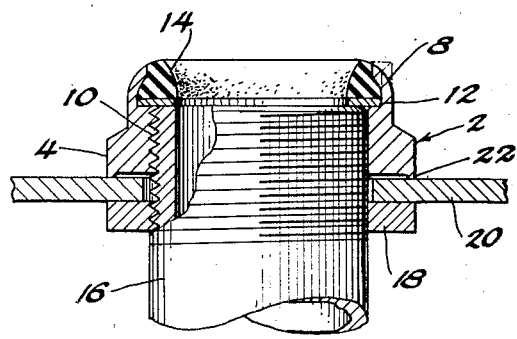
Figure 1 is a sectional view of the bushing of our invention as applied to the conduit.

With particular reference to Figure 1 it should be noted that the washer 12 extends radially inward far enough to overlie the end of the conduit and therefore takes the mechanical thrust of the conduit end from the insulating ring 14 and prevents its cracking. Also the insulating ring extends slightly farther inwardly than the ring 12 and the inner surface of the member 14 is curved upwardly and outwardly and extends up above the edge of the inwardly turned portion 8. This construction places insulating material at a point where any cables extending through the conduit will contact the insulating material and if the cable insulation breaks down will still prevent the current from grounding to the box or conduit.

Figure 3:
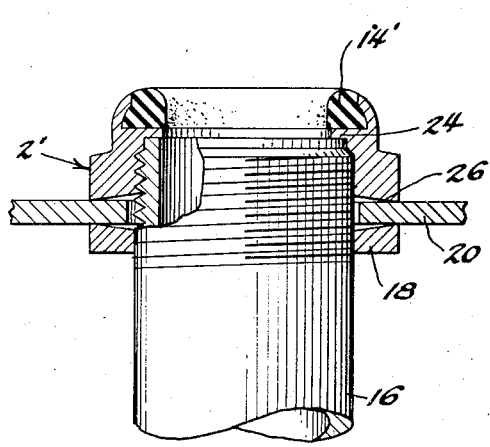
Figure 3 is a view similar to Figure 1 of a modified form of our invention.

In Figure 3 is shown a modified form of our invention. The bushing 2' in this instance is substantially the same form with the exception that an internal integral flange 24 is formed in the body between the upper and lower sections to take the place of the separate washer 12. The only separate part in this construction is the insulating circular member 14' which is held to the main body by the upper portion being bent inwardly over the insulating member as before in such a position as to contact any cable extending out of the upper bushing end.

The bushing is applied to a conduit end as before and the lower surface of the bushing in this case is tapered as shown at 26 to provide means for scarring and protruding into the box surface to assist in locking action and to provide a satisfactory electrical ground. The internal flange 24 in this instance takes the thrust of the conduit end.

It is therefore evident that we have provided an insulated bushing having locking and grounding action with a box, means against which the conduit end may bear and insulating material positioned to contact any cable coming from the conduit at any position for use to prevent any short circuiting or grounding of the supply circuit, the locking means in the lower face having the same action as a locknut so that this device may be termed a combined locknut and bushing.

We claim:

An insulated bushing comprising, a short cylindrical body having a plurality of different bores forming a shoulder therebetween, a ring disposed on said shoulder and extending inwardly, an insulating member fitting within one bore and seating on the smaller bore, the outer end of the larger bore being bent inwardly over the insulating member to clamp the member in place.

ROMAN J. TINGLE.
WILLIAM W. BARCY.
JOHN E. FUCHS.